Sept. 1, 1953    G. E. DATH    2,650,719
FRICTION SHOCK ABSORBING MECHANISM FOR RAILWAY CARS
Filed July 21, 1950    2 Sheets-Sheet 1
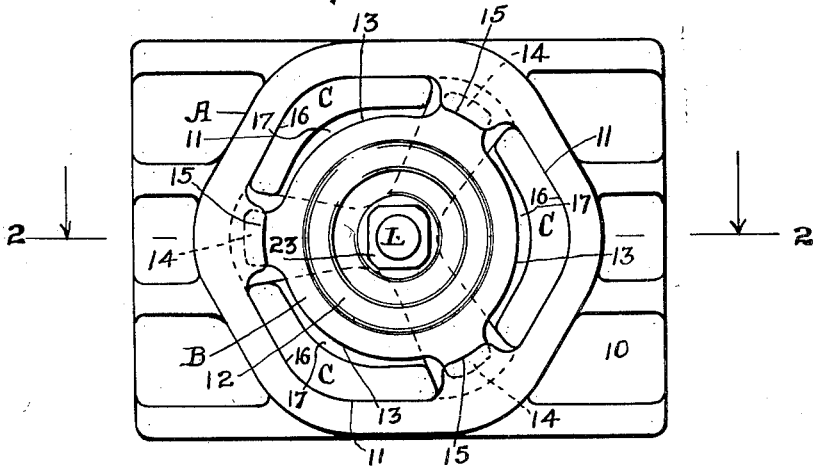
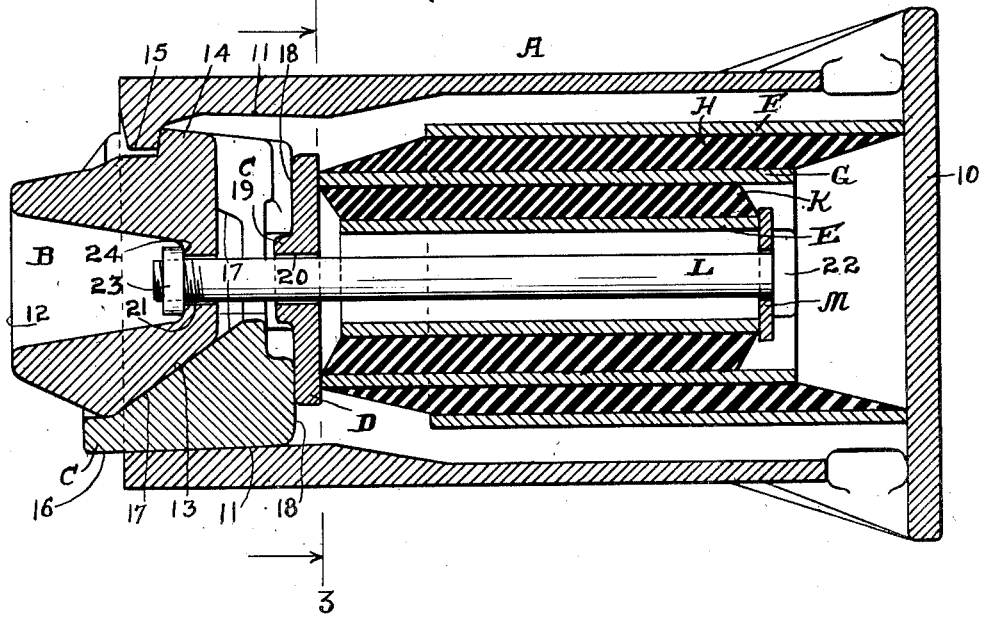
Inventor:
George E. Dath.
By Henry Fuchs
Atty.

Sept. 1, 1953             G. E. DATH             2,650,719
FRICTION SHOCK ABSORBING MECHANISM FOR RAILWAY CARS
Filed July 21, 1950             2 Sheets-Sheet 2
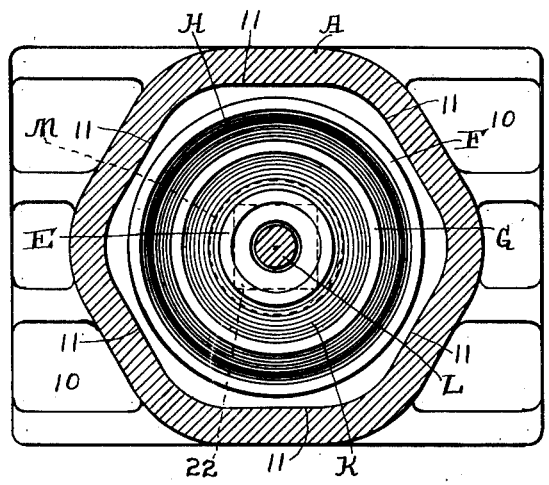
Inventor:
George E. Dath.
By Henry Fuchs
Attys.

Patented Sept. 1, 1953

2,650,719

UNITED STATES PATENT OFFICE 2,650,719

FRICTION SHOCK ABSORBING MECHANISM FOR RAILWAY CARS

George E. Dath, Mokena, Ill., assignor to W. H. Miner, Inc., Chicago, Ill., a corporation of Delaware Application July 21, 1950, Serial No. 175,262

3 Claims. (Cl. 213—34)

1

This invention relates to improvements in friction shock absorbing mechanisms especially adapted for draft riggings of railway cars.

One object of the invention is to provide a friction shock absorbing mechanism of high capacity, comprising a friction casing, friction shoes slidingly telescoped within the casing, a wedge pressure transmitting member in wedging engagement with the shoes, yielding resistance means opposing movement of the shoes inwardly of the casing and pressing the shoes against the wedge, and yielding means under constant compression reacting between the wedge and the shoes for wedging the shoes apart to hold the same in frictional engagement with the casing independently of the pressure exerted by the yielding resistance means.

A further object of the invention is to provide a mechanism as set forth in the preceding paragraph, wherein the yielding resistance means, which opposes inward movement of the shoes, and the yielding means which reacts between the wedge and shoes, comprise rubber elements subjected to both compression and sheer in yieldingly resisting relative movement of the parts of the mechanism.

A more specific object of the invention is to provide a friction shock absorbing mechanism comprising a friction casing open at one end and closed at the other end, friction shoes slidingly telescoped within the open end of the casing, a wedge in wedging engagement with the shoes, a follower bearing on the inner ends of the shoes, a hollow tubular member bearing on the follower, a second hollow tubular member bearing on the closed end of the casing, a tubular rubber sleeve interposed between said tubular members and vulcanized to the same, whereby, upon relative lengthwise movement of said members produced by inward movement of the shoes, the rubber sleeve is subjected to shearing pressure to yieldingly oppose inward movement of the shoes, and wherein additional means is provided for forcing the wedge against the shoes, comprising a third tubular member normally spaced from said follower, and a second rubber sleeve interposed between said last named and first named tubular members and vulcanized to the latter to be subjected to shearing pressure upon relative lengthwise displacement of said two last named members, and a bolt connecting the wedge to the rear end of said third tubular member to maintain the second named rubber sleeve under pressure to force the wedge against the shoes.

Other objects of the invention will more clearly

2 appear from the description and claims hereinafter following.

In the accompanying drawings forming a part of this specification, Figure 1 is a front end elevational view of my improved friction shock absorbing mechanism. Figure 2 is a horizontal sectional view, corresponding substantially to the line 2—2 of Figure 1. Figure 3 is a transverse, vertical sectional view, corresponding substantially to the line 3—3 of Figure 2.

Referring to the drawings, my improved friction shock absorbing mechanism comprises broadly a friction casing A, a wedge B, three friction shoes C—C—C, a follower disc D, an inner tubular member E, an outer tubular member F, an intermediate tubular member G, a main rubber sleeve H between the outer and intermediate tubular members and vulcanized to the same, an auxiliary rubber sleeve K between the intermediate and inner tubular members and vulcanized to the same, a bolt L, a washer M cooperating with the bolt L and the inner tubular member E.

The friction casing A is in the form of a tubular member of hexagonal, transverse cross section, open at its front end and closed by a transverse wall 10 at its rear end. The wall 10 is preferably extended outwardly beyond opposite sides of the casing to provide an integral follower member designed to cooperate with the corresponding stop lugs of the draft rigging of a railway car. At the open end, the casing presents three lengthwise extending, interior friction surfaces 11—11—11 of V-shaped, transverse cross section. The surfaces 11—11—11 preferably converge inwardly of the casing, as shown in Figure 2.

The wedge B is in the form of a block having a flat front end face 12, which receives the actuating force. At its inner end, the wedge B has three wedge faces 13—13—13 preferably of V-shaped, transverse cross section, which converge inwardly of the mechanism and engage the shoes C—C—C. Outward movement of the wedge B with respect to the casing A is limited by radially projecting lugs 14—14—14 on said wedge, extending between adjacent shoes C—C and engaging in back of interior stop lugs 15—15—15 on the casing A.

The shoes C—C—C have lengthwise extending, V-shaped friction surfaces 16—16—16 on their outer sides, which are in sliding contact with the friction surfaces 11—11—11 of the casing A. On their inner sides, the shoes C—C—C have V-shaped wedge faces 17—17—17, which are engaged, respectively, by the wedge faces 13—13—13 of the wedge B. As shown in Figure 2, the shoes C—C—C have flat, transverse inner end faces 18—18—18.

The follower disc D is in the form of a circular plate, bearing on the flat inner end faces 18—18—18 of the shoes C—C—C and having an outwardly projecting, central boss 19, which is engaged between the shoes C—C—C to center the disc D.

The inner tubular member E is formed of sheet metal and, in the full release position of the mechanism, has its front end spaced inwardly from the follower disc D, as shown in Figure 2. The intermediate tubular member G is also formed of sheet metal and surrounds the member E in spaced relation to the same. The outer tubular member F is likewise formed of sheet metal and surrounds the intermediate member G in spaced relation to the same. The two members G and F are preferably of the same length and of greater length than the member E. The member F has its rear end abutting the wall 10 of the casing and its front end spaced inwardly from the follower disc D, and the member G has its front end abutting the follower disc D and its rear end spaced from the rear wall 10 of the casing.

The main rubber sleeve H is of cylindrical cross section, fills the space between the intermediate and outer members G and F, and has its inner and outer sides vulcanized to these members. As shown in Figure 2, the front end of the sleeve H is beveled off toward the member G, and the rear end of the same is beveled off toward the member F.

The auxiliary rubber sleeve K, which is also of cylindrical cross section, fills the space between the inner and intermediate members E and G and has its inner and outer sides vulcanized to these two members, respectively. As shown in Figure 2, the front end of the sleeve K is beveled off toward the member G, and the rear end of the same is beveled off toward the member E.

The bolt L extends through the tubular member E and openings 20 and 21 in the disc D and wedge B. The bolt L has a head 22 at its rear end and a nut 23 threaded on its front end. The nut 23 is engaged with an interior shoulder 24 on the wedge B, and the head 22 of said bolt abuts the washer M, which is interposed between said head and the rear end of the tubular member E.

The bolt L is adjusted so that the rubber sleeve K is under initial shearing tension and through the tubular members G and E exerts pressure in opposite directions on the follower disc D and the washer M, respectively, to press the bolt L against the wedge B, thus wedging the shoes C—C—C apart and holding the same under pressure, against the friction surfaces of the casing A.

The operation of my improved shock absorbing mechanism is as follows: Upon compression of the mechanism, the wedge B is forced inwardly of the casing, carrying the shoes therewith and sliding the same on the friction surfaces of the casing. Frictional resistance is had immediately upon compression of the mechanism, due to the wedge being forced against the shoes by the action of the rubber sleeve K. This frictional resistance is further increased as the mechanism is being compressed, by wedging action of the wedge B on the shoes C—C—C, which have their inward movement resisted by the rubber sleeve H. High frictional resistance is thus provided, which progressively increases as the tubular member G is forced rearwardly with respect to the tubular member F. Inasmuch as the rubber sleeve H is vulcanized to the tubular members G and F, the same is subjected to shearing pressure as the wedge B and the shoes C—C—C are forced inwardly of the casing A.

I claim:

1. In a friction shock absorbing mechanism, the combination with a friction casing open at one end and closed at the other end by a transverse wall, said casing having interior friction surfaces at said open end; of friction shoes telescoped within said open end of the casing in sliding engagement with the friction surfaces thereof; a wedge in wedging engagement with the shoes; a follower bearing on the inner ends of said shoes; inner, outer, and intermediate, lengthwise extending, tubular members within the casing; a rubber sleeve between said inner and intermediate tubular members, having its opposite sides vulcanized to said inner and intermediate members, respectively; a second rubber sleeve between said intermediate and outer tubular members having its opposite sides vulcanized to said intermediate and outer members, respectively, said intermediate tubular member bearing at its front end on said follower, said outer tubular member bearing at its rear end on said transverse wall of the casing, said inner tubular member having its front end spaced from said follower; and means operatively connecting the rear end of said inner member to the wedge for transmitting pressure from the wedge to the shoes.

2. In a friction shock absorbing mechanism, the combination with a friction casing open at one end and closed at the other end by a transverse wall, said casing having interior friction surfaces at said open end; of friction shoes telescoped within said open end of the casing in sliding engagement with the friction surfaces thereof; a wedge in wedging engagement with the shoes; a follower bearing on the inner ends of said shoes; inner, outer, and intermediate, lengthwise extending, tubular members within the casing; a rubber sleeve between said inner and intermediate, tubular members, having its opposite sides vulcanized to said inner and intermediate members, respectively; a second rubber sleeve between said intermediate and outer tubular members, having its opposite sides vulcanized to said intermediate and outer members, respectively, said intermediate tubular member having its front end bearing on said follower and its rear end spaced from said transverse wall of the casing, said outer member having its rear end bearing on said transverse wall and its front end spaced from said follower, said inner tubular member having its front end spaced from said follower; and means operatively connecting the rear end of said inner member to the wedge for transmitting pressure from the wedge to the shoes.

3. In a friction shock absorbing mechanism, the combination with a friction casing open at one end and closed at the other end by a transverse wall, said casing having interior friction surfaces at said open end; of friction shoes telescoped within said open end of the casing in sliding engagement with the friction surfaces thereof; a wedge in wedging engagement with the shoes; a follower bearing on the inner ends of said shoes; inner, outer, and intermediate, lengthwise extending, tubular members within the casing; a rubber sleeve between said inner and intermediate, tubular members, having its opposite sides vulcanized to said inner and intermediate members, respectively; a second rubber sleeve between said intermediate and outer tubular members, having its opposite sides vulcanized to said intermediate and outer members, respectively, said intermediate tubular member having its front end bearing on said follower and its rear end spaced from said transverse wall of the casing, said outer member having its rear end bearing on said transverse wall and its front end spaced from said follower, said inner tubular member having its front end spaced from said follower; a washer bearing on the rear end of said inner member; and a bolt having its opposite ends in shouldered engagement with said washer and said wedge, respectively.

GEORGE E. DATH.

References Cited in the file of this patent

UNITED STATES PATENTS

| Number | Name | Date |
|---|---|---|
| 2,333,249 | Haseltine | Nov. 2, 1943 |
| 2,118,006 | Couch | May 17, 1938 |
| 2,352,030 | Sproul | June 20, 1944 |
| 2,592,731 | Peterson | Apr. 15, 1952 |